(12) United States Patent
Liu et al.

(10) Patent No.: US 12,407,227 B2
(45) Date of Patent: Sep. 2, 2025

(54) ELECTRIC OIL PUMP (71) Applicant: ZHEJIANG SANHUA AUTOMOTIVE COMPONENTS CO., LTD., Zhejiang (CN)

(72) Inventors: Lili Liu, Zhejiang (CN); Dongdong Sun, Zhejiang (CN); Wei Ye, Zhejiang (CN); Weijie Shi, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 134 days.

(21) Appl. No.: 18/026,581

(22) PCT Filed: Sep. 14, 2021

(86) PCT No.: PCT/CN2021/118180
§ 371 (c)(1),
(2) Date: Mar. 15, 2023

(87) PCT Pub. No.: WO2022/057785
PCT Pub. Date: Mar. 24, 2022

(65) Prior Publication Data
US 2023/0336057 A1  Oct. 19, 2023

(30) Foreign Application Priority Data

Sep. 15, 2020 (CN) .................. 202010970515.X
Sep. 15, 2020 (CN) .................. 202011057359.4

(51) Int. Cl.
H02K 11/40 (2016.01)
F04C 2/10 (2006.01)
(Continued)

(52) U.S. Cl.
CPC ............... *H02K 11/40* (2016.01); *F04C 2/10* (2013.01); *F04C 13/002* (2013.01); *H02K 11/02* (2013.01);
(Continued)

(58) Field of Classification Search
CPC ........ H02K 11/40; H02K 11/02; H02K 11/33; H02K 2211/03; H02K 2203/09;
(Continued)

(56) References Cited

U.S. PATENT DOCUMENTS

2015/0102693 A1  4/2015  Pondelek
2015/0194864 A1  7/2015  Harvey
(Continued)

FOREIGN PATENT DOCUMENTS

CN  105874686 A  8/2016
CN  208967181 U  6/2019
(Continued)

OTHER PUBLICATIONS

First Office Action dated Mar. 5, 2024 for Japanese patent application No. 2023-516750, English translation provided by Global Dossier.
European Search Report issued on Sep. 19, 2024 for the European counterpart application No. 21868608.7.
International Search Report for PCT/CN2021/118180 mailed Dec. 7, 2021, ISA/CN.

*Primary Examiner* — Dominick L Plakkoottam
(74) *Attorney, Agent, or Firm* — Yue (Robert) Xu; Apex Attorneys at Law, LLP (57) ABSTRACT

An electric oil pump comprises a stator assembly and an electronic control panel assembly which are electrically connected. The electronic control panel assembly comprises an electronic component. The electric oil pump further comprises a conductive pump housing and a conductive member that electrically connects a reference ground layer of the electronic control panel assembly and the pump housing. The above arrangement facilitates reducing elec- (Continued)

tromagnetic radiation of the electronic control panel assembly, thereby reducing interference of the electromagnetic radiation of the electronic control panel assembly on the electronic component and/or other external devices.

13 Claims, 10 Drawing Sheets (51) Int. Cl.
*F04C 13/00* (2006.01)
*H02K 11/02* (2016.01)
*H02K 11/33* (2016.01)

(52) U.S. Cl.
CPC ........ *H02K 11/33* (2016.01); *F04C 2210/206* (2013.01); *F04C 2240/30* (2013.01); *F04C 2240/40* (2013.01); *H02K 2211/03* (2013.01)

(58) Field of Classification Search
CPC ............ H02K 3/522; H02K 7/14; H02K 3/46; H02K 11/30; F04C 2/10; F04C 13/002; F04C 2210/206; F04C 2240/30; F04C 2240/40; F04C 11/008; F04C 2240/808; F04C 2/102; F04C 11/00; F04C 15/00
See application file for complete search history.

(56) References Cited

U.S. PATENT DOCUMENTS

| | | | | |
|---|---|---|---|---|
| 2015/0333596 | A1* | 11/2015 | Berkouk | H05K 3/4015 310/71 |
| 2015/0354563 | A1* | 12/2015 | Takahashi | F04B 17/03 417/410.4 |
| 2019/0186571 | A1 | 6/2019 | Takahashi et al. | |
| 2019/0277294 | A1* | 9/2019 | Hoshiko | F04D 13/0686 |
| 2020/0086258 | A1* | 3/2020 | Dom | B01D 46/0087 |
| 2021/0036586 | A1* | 2/2021 | Schulz | H02K 5/225 |
| 2021/0239115 | A1 | 8/2021 | Yin et al. | |
| 2021/0313864 | A1* | 10/2021 | Zhang | H02K 11/40 |
| 2022/0158507 | A1 | 5/2022 | Yuan et al. | |

FOREIGN PATENT DOCUMENTS

| | | |
|---|---|---|
| CN | 110541818 A | 12/2019 |
| CN | 111765289 A | 10/2020 |
| CN | 212992147 U | 4/2021 |
| JP | 2014181562 A | 9/2014 |
| JP | 2016039672 A | 3/2016 |
| JP | 2017-103922 A | 6/2017 |
| JP | 2020-72500 A | 5/2020 |
| WO | 2019/228312 A1 | 12/2019 |

* cited by examiner

ELECTRIC OIL PUMP

The present application is a National Phase entry of PCT Application No. PCT/CN2021/118180, filed on Sep. 14, 2021, which claims the benefit of priorities to the following two Chinese patent applications, which are incorporated herein by reference in their entireties, 1) Chinese Patent Application No. 202010970515.X, titled "ELECTRIC OIL PUMP", filed with the China National Intellectual Property Administration on Sep. 15, 2020 and 2) Chinese Patent Application No. 202011057359.4, titled "ELECTRIC OIL PUMP", filed to the China National Intellectual Property Administration on Sep. 29, 2020, the application date is Sep. 15, 2020.

FIELD

The present application relates to the technical field of vehicles, and in particular to an assembly of a lubrication system and/or a cooling system of a vehicle.

BACKGROUND

An electronic oil pump mainly provides power source for a lubrication system and/or cooling system of a vehicle; the electronic oil pump includes an electric control board assembly, the electric control board assembly includes an electronic component; during the use of the electronic oil pump, the electric control board assembly may generate electromagnetic radiation, these electromagnetic radiation may cause interference to electronic components and/or other external devices, thus affecting the performance or use of electronic components and/or other external devices.

SUMMARY

An object according to the present application is to provide an electronic oil pump, which may reduce an electromagnetic radiation of an electric control board assembly, and further reduce the interference of the electromagnetic radiation of the electric control board assembly to electronic components and/or other external devices.

In order to achieve the above object, the following technical solution is provided according to an embodiment of the present application.

An electronic oil pump includes a stator assembly and an electric control board assembly, the stator assembly is electrically connected with the electric control board assembly, the electric control board assembly includes an electronic component; the electronic oil pump further includes a pump housing and a conductive member, the pump housing can conduct electricity, and the conductive member electrically connects a reference ground plane of the electric control board assembly with the pump housing.

In this way, because the conductive member is electrically connected with the reference ground plane of the electric control board assembly and the pump housing, a low impedance path can be provided for the interference voltage in the electric control board assembly, which is beneficial to reducing an electromagnetic radiation of an electric control board assembly, and further to reducing the interference of the electromagnetic radiation of the electric control board assembly to electronic components and/or other external devices.

DETAILED DESCRIPTION OF THE EMBODIMENTS

The present application is further described as follows in conjunction with the drawings and specific embodiments.

The electronic oil pump in the following embodiment mainly provide flowing power for the working medium of the lubrication system and/or cooling system of a vehicle, and specifically provide flowing power for the working medium of the lubrication system and/or cooling system in a transmission system of the vehicle.

Figure 1:
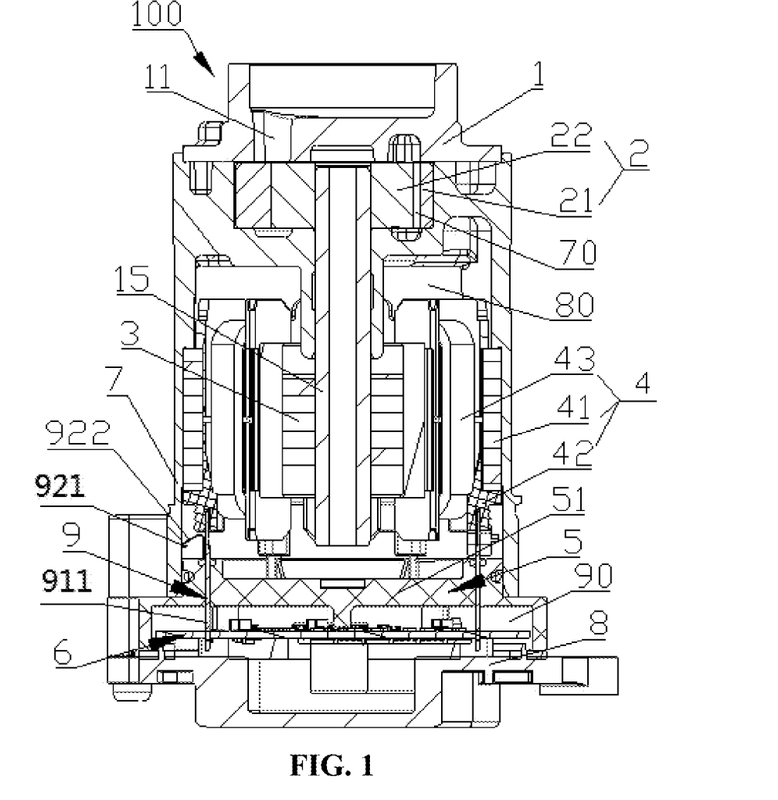
FIG. 1 is a schematic cross-sectional structural view of a first embodiment of an electronic oil pump provided according to the present application.

Referring to FIG. 1, an electronic oil pump 100 includes a pump housing, a first rotor assembly 2, a stator assembly 4, a second rotor assembly 3 and an electric control board assembly 6; the pump housing forms a pump cavity, and, the first rotor assembly 2, the stator assembly 4, the second rotor assembly 3 and the electric control board assembly 6 are arranged in the pump cavity, in this embodiment, the pump cavity includes a first cavity 70, a second cavity 80 and a third cavity 90, and, the first cavity 70, the second cavity 80 and the third cavity 90 are sequentially distributed along the height direction, the first rotor assembly 2 is arranged in the first cavity 70, the stator assembly 4 and the second rotor assembly 3 are arranged in the second cavity 80, the electric control board assembly 6 is arranged in the third cavity 90. The first cavity 70 is communicated with the second cavity 80, and the second cavity 80 is not communicated with the third cavity 90; the stator assembly 4 includes a stator iron core 41, an insulating frame 42 and a winding 43, and, the insulating frame 42 covers at least part of a surface of the stator iron core 41, and the winding 43 is wound around the insulating frame 42; when the electronic oil pump 100 operates, the electric control board assembly 6 controls the current in the winding 43 passing through the stator assembly 4 to change according to a predetermined rule, thereby controlling the stator assembly 4 to generate a changing excitation magnetic field, the second rotor assembly 3 rotates under the action of the excitation magnetic field, and the second rotor assembly 3 can directly or indirectly drive the first rotor assembly 2 to rotate; when the first rotor assembly 2 rotates, a volume of the hydraulic chamber between the first rotor and the second rotor of the first rotor assembly 2 changes, so that the working medium is pressed out to the outlet to generate flowing power; in this embodiment, at least part of the working medium in the first cavity 70 can flow into the second cavity 80, the working medium in the second cavity 80 can cool the stator assembly 4 since the stator assembly 4 is arranged in the second cavity 80, facilitating the heat dissipation of the stator assembly 4.

Referring to FIG. 1, in this embodiment, the pump housing includes a pump cover 1, a first housing 7 and a second housing 8, and, the pump cover 1 is fixedly connected with the first housing 7 and the first housing 7 is fixedly connected with the second housing 8; specifically, in this embodiment, the pump cover 1 is connected with the first housing 7 by screws or bolts, this arrangement makes the disassembly and assembly of the electronic oil pump more convenient, thus facilitating the maintenance of the first rotor assembly 2 of the electronic oil pump, of course, the pump cover 1 and the first housing 7 may also be connected by other ways, such as plugging and clamping; the first housing 7 is fixedly connected with the second housing 8, specifically, the first housing 7 and the second housing 8 are connected by screws or bolts, so that the electronic oil pump is more convenient to assemble and disassemble, in this embodiment, the electric control board assembly 6 is arranged in the cavity between the first housing 7 and the second housing 8, which is beneficial to the maintenance of the electric control board assembly in the electronic oil pump, and the connection between the first housing 7 and the second housing 8 is relatively reliable, of course, the first housing 7 and the second housing 8 may also be connected by plugging, clamping or other means.

Figure 2:
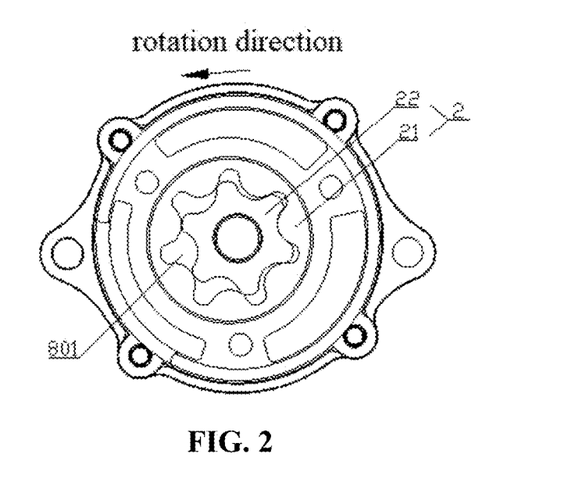
FIG. 2 is a schematic front view of the electronic oil pump in FIG. 1 with a pump cover removed.

Referring to FIG. 1 and FIG. 2, the first rotor assembly 2 includes a first rotor 21 and a second rotor 22, the first rotor 21 includes multiple inner teeth, and the second rotor 22 includes multiple outer teeth, a hydraulic cavity 801 is formed between the inner teeth of the first rotor 21 and the outer teeth of the second rotor 22, in this embodiment, the hydraulic cavity is also a part of the first cavity 70, in this embodiment, the first rotor 21 is sleeved on an outer periphery of the second rotor 22. Referring to FIG. 1 again, the electronic oil pump further includes an inlet 11 and an outlet (not shown), the working medium can enter the hydraulic cavity 801 through the inlet 11 and leave the hydraulic cavity 801 through the outlet (not shown); as there is a certain eccentricity between the first rotor 21 and the second rotor 22, some outer teeth of the second rotor 22 mesh with some inner teeth of the first rotor 21 when the second rotor 22 rotates, thus driving the first rotor 21 to rotate; during one revolution of the first rotor 21 and the second rotor 22, an internal volume of the hydraulic cavity 801 changes, specifically, when the first rotor assembly 2 rotates to a certain angle from the initial position, the volume in the hydraulic cavity 801 gradually increases to form a partial vacuum, the working medium is sucked into the hydraulic cavity 801 from the inlet 11, when the first rotor 21 and the second rotor 22 continue to rotate, the volume of the hydraulic cavity 801 filled with the working medium gradually decreases, and the working medium is squeezed, so that the working medium entering the hydraulic cavity 801 is pressed out to the outlet (not shown), thereby generating flowing power; in this embodiment, the electronic oil pump 100 further includes a pump shaft 15, which can drive part of the first rotor assembly 2 to rotate, specifically, in this embodiment, the pump shaft 15 can drive the second rotor 22 to rotate, in this embodiment, the pump shaft 15 is connected with the second rotor 22, and the pump shaft 15 is connected with the second rotor assembly 3, the second rotor assembly 3 drives the second rotor 22 to rotate through the pump shaft 15, thereby realizing the rotation of the first rotor assembly 2.

Referring to FIG. 1, FIG. 1 is a structural diagram of a first embodiment of an electronic oil pump in the present application; the structure of the electronic oil pump of the first embodiment is described in detail below.

Referring to FIG. 1, the electronic oil pump 100 further includes a conductive member 9, the conductive member 9 electrically connects the reference ground plane of the electric control board assembly 6 with the first housing 7, and the first housing 7 can conduct electricity; at least part of the conductive member 9 is located in the inner cavity of the first housing 7, the material of the first housing 7 is metal, and the first housing 7 partially surrounds the periphery of the stator assembly 4; the stator assembly 4 is located in the inner cavity of the first housing 7, and when the winding 43 of the stator assembly 4 radiates electromagnetic waves outward or when an external system radiates electromagnetic waves to the first housing 7, on one hand, the electromagnetic wave radiated by the winding 43 can be absorbed and reflected by the first housing 7 itself, which is beneficial to preventing the electromagnetic wave radiated by the winding 43 from affecting the external system, on the other hand, the electromagnetic wave radiated by the external system can be absorbed and reflected by the first housing 7 itself, which is beneficial to preventing the electromagnetic wave radiated by the external system from affecting the performance of the electronic oil pump; specifically, referring to FIG. 1, the conductive member 9 includes a first part 911 and a second part 921, the first part 911 is electrically connected with the reference ground plane of the electric control board assembly 6, the second part 921 abuts against the inner wall of the first housing 7, the reference ground plane of the electric control board assembly 6 is electrically conducted with the first housing 7 through the conductive member 9; in this way, since the first housing 7 is electrically connected with the reference ground plane of the electric control board assembly 6, the beneficial effects are: firstly, a low-impedance path is provided for the interference voltage in the electric control board assembly 6, which is conducive to reducing the electromagnetic radiation of the electric control board assembly 6, and further beneficial to reducing the interference of the electromagnetic radiation of the electric control board assembly 6 to electronic components and/or other external devices; secondly, when the surface of the first housing 7 has static electricity, the static electricity can be transmitted to the reference ground plane of the electric control board assembly 6 through the conductive member 9, when the reference ground plane of the electric control board assembly 6 is grounded to the outside, the static electricity on the reference ground plane is conducted to the outside grounding point, which is conducive to reducing the static electricity accumulated on the surface of the first housing 7, and thus to reducing the impact of the above static electricity on the performance of the external system and/or the electric control board assembly 6, thirdly, when the surface of the electric control board assembly 6 has static electricity, the above static electricity can be conducted to the first housing 7 through the conductive member 9, which is conducive to reducing the static electricity accumulated on the surface of the electric control board assembly 6, and further helps to reduce the influence of the above static electricity on the performance of external systems and/or electronic components; besides, in this embodiment, the pump cover 1, the first housing 7 and the second housing 8 are made of metal, and, the stator core 41, the second housing 8 and the pump cover 1 are all in contact with the first housing 7, so that the stator core 41 and the second housing 8 are electrically connected with the reference ground plane of the electric control board assembly 6, on one hand, the static electricity on the surface of the stator core 41, the second housing 8 and the pump cover 1 can be conducted to the reference ground plane of the electric control board assembly 6, the above static electricity is conducted to the outside grounding point, which is conducive to reducing the influence of static electricity on the electric control board assembly 6 and/or other external devices; on the other hand, the grounding area of the electronic oil pump can be increased, which can provide a low impedance path for the interference voltage in the electric control board assembly 6 and the stator assembly 4, which is beneficial to reducing an electromagnetic radiation of the electric control board assembly 6 and the stator assembly 4, and further to reducing the interference of the above electromagnetic radiation to electronic components and/or other external devices; in this embodiment, the pump cover 1, the first housing 7 and the second housing 8 are made of metal, of course, it is also possible that the material of the first housing 7 is metal, and the material of the pump cover 1 and the second housing 8 is nonmetal. Referring to FIG. 1, in this embodiment, one end of the conductive member 9 contacts with the first housing 7, but of course, one end of the conductive member 9 may also contact the stator core 41 or the second housing 8.

Figure 3:
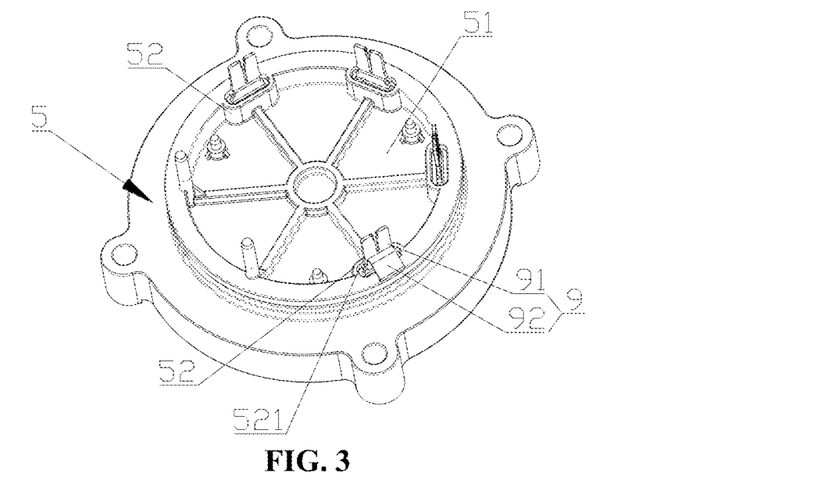
FIG. 3 is a three-dimensional structure diagram of a partition member and a conductive member in FIG. 1 assembled together.
Figure 4:
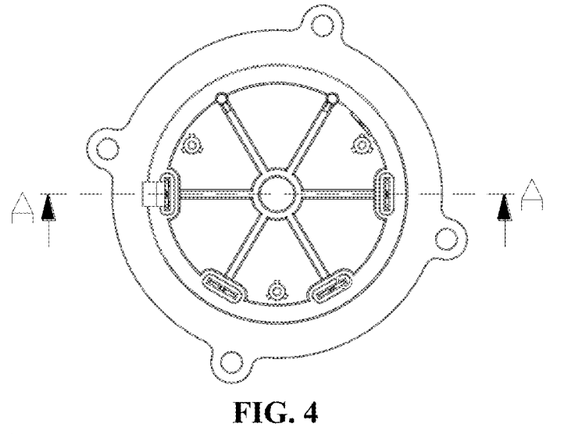
FIG. 4 is a schematic diagram of a front structure of the partition member and the conductive member assembled together in FIG. 3.
Figure 5:
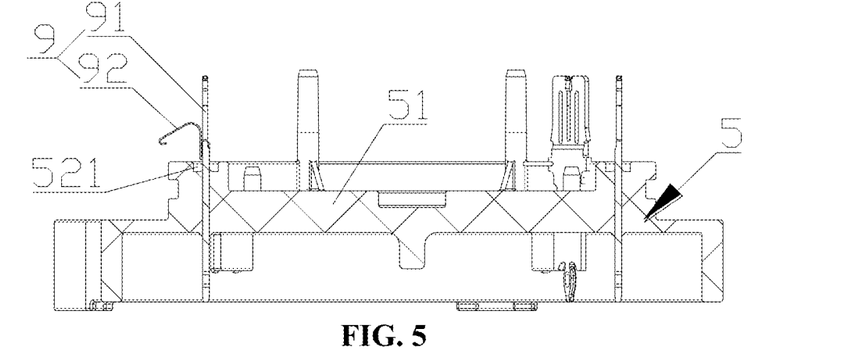
FIG. 5 is a schematic structural diagram of a section taken along the A-A direction in FIG. 4.

Referring to FIG. 1 and FIG. 3, the electronic oil pump 100 further includes a partition member 5, at least part of the partition member 5 is arranged between the stator assembly 4 and the electric control board assembly 6, the second cavity 80 is located at one side of the main body 51 of the partition member 5, the third cavity 90 is located on the other side of the main body 51 of the partition member 5; in this embodiment, part of the conductive member 9 is fixedly connected with the main body 51 of the partition member 5, the conductive member 9 passes through the main body 51 of the partition member 5 in the vertical direction of the electronic oil pump 100, specifically, in this embodiment, the conductive member 9 is used as an insert, and the partition member 5 is formed by injection molding, that is, the conductive member 9 and the partition member 5 are fixedly connected by injection molding, the joint between the conductive member 9 passing through the partition member 5 and the partition member 5 is sealed; specifically, referring to FIG. 3 to FIG. 5, the partition member 5 includes a first convex part 52, the first convex part 52 protrudes from the upper surface of the main body 51 of the partition member 5, and part of the conductive member 9 passes through the first convex part 52; the first convex part 52 includes a groove 521, and the groove 521 is recessed from the upper surface of the first convex part 52, the groove 521 does not reach the lower surface of the main body 51 of the partition member 5, the conductive member 9 passing through the main body 51 of the partition member 5 passes through the groove 521, there is a gap between the outer periphery of the conductive member 9 located in the groove 521 and the inner wall of the groove 521, and the gap is filled with sealant, the sealant helps to prevent the working medium in the second cavity 80 from leaking to the third cavity 90 through the joint between the conductive member 9 and the partition member 5, so as not to affect the performance of the electric control board assembly 6 located in the third cavity 90.

Figure 6:
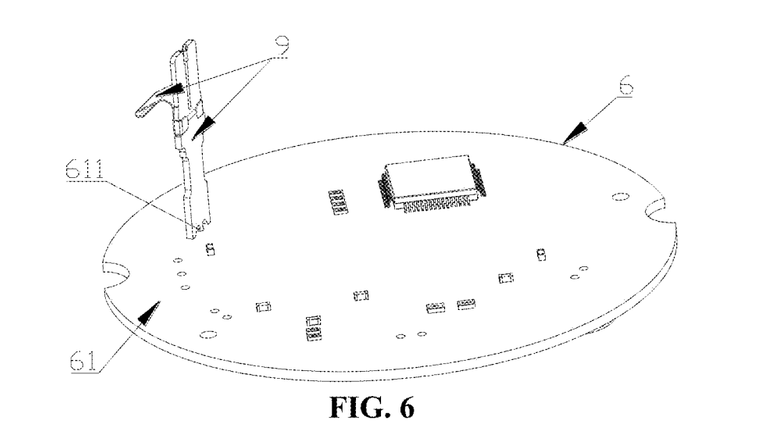
FIG. 6 is a three-dimensional structure diagram of an electric control board assembly and the conductive member in FIG. 1.
Figure 7:
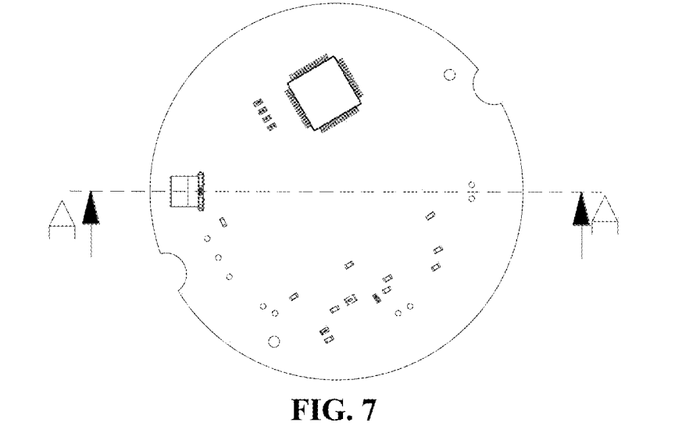
FIG. 7 is a schematic diagram of a front structure of the electric control board assembly and the conductive member in FIG. 6.
Figure 8:
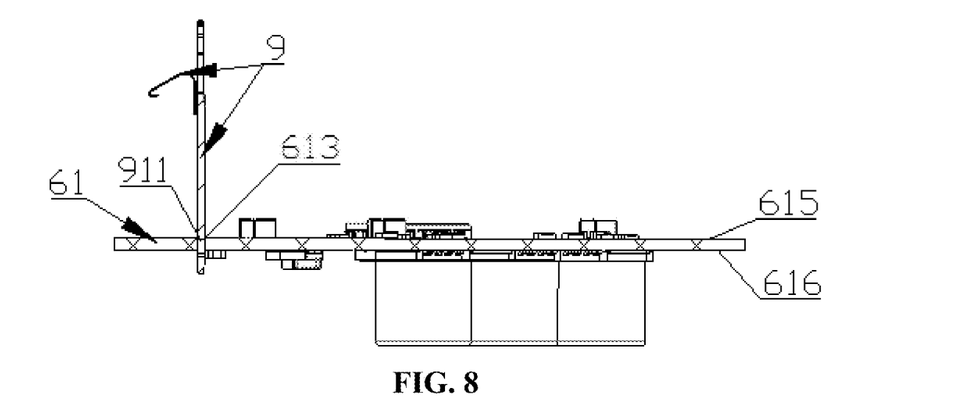
FIG. 8 is a schematic structural diagram of a section taken along the A-A direction in FIG. 67.

Referring to FIG. 6 to FIG. 8, the electric control board assembly 6 includes a substrate 61, the substrate 61 includes a first surface 615 and a second surface 616, the first surface 615 is closer to the stator assembly 4 than the second surface 616; the substrate 61 includes a through hole 611, the through hole 611 is defined in the thickness direction of the substrate 61, the first part 911 of the conductive member 9 inserts into the through hole 611 and is tightly matched with the through hole 611; in this embodiment, the first part 911 of the conductive member 9 is connected with the substrate 61 by providing the through hole 611 in the substrate 61, of course, it is also possible to connect the first part 911 of the conductive member 9 with the substrate 61 by providing an abutting part 613 on the electric control board assembly 6, the abutting part 613 is located on the first surface 615, the abutting part 613 is electrically connected with the reference ground plane of the electric control board assembly 6, the first part 911 is in contact with the abutting part 613 and electrically connected with the abutting part 613, the "abutting part" here may be a separate conductive part, which is fixedly connected with the substrate 61, or it may be a conductive layer, the conductive layer can be treated by tin plating, chemical nickel plating and gold immersion.

Figure 9:
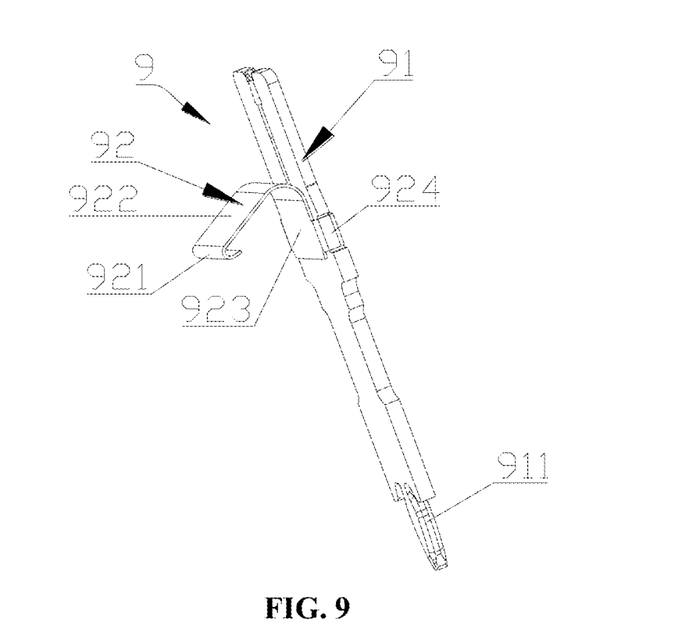
FIG. 9 is a schematic three-dimensional structure diagram of the conductive member in FIG. 1.
Figure 10A:
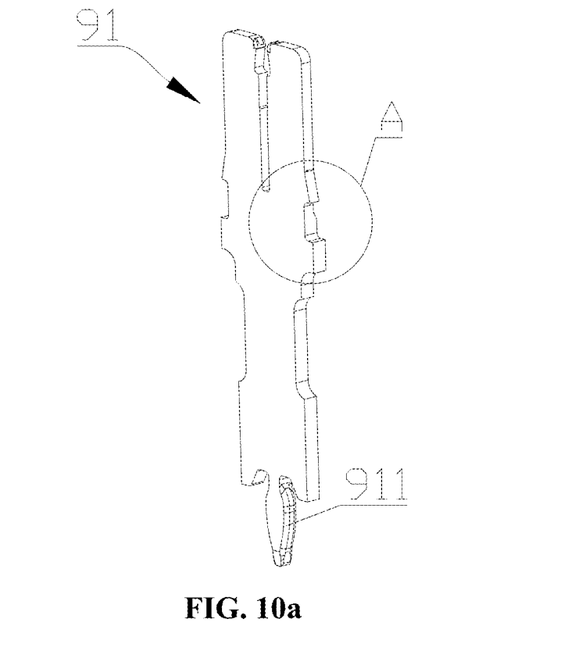
FIG. 10a is a three-dimensional structure diagram of a first conductive part in FIG. 9.
Figure 10B:
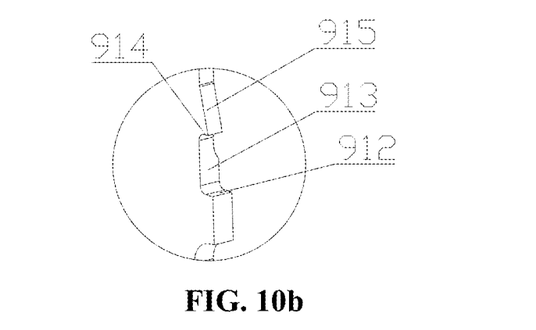
FIG. 10b is an enlarged structural diagram of part A of the first conductive part in the left figure.

Referring to FIG. 9 to FIG. 10, in this embodiment, the conductive member 9 is at least partially elastic, and the elastic conductive member 9 includes an inclined part 922, the front end of the inclined part 922 is connected with the second part 921, or, the second part 921 is located at the front end of the inclined part 922, the inclined part 922 is integrally provided with the second part 921; in combination with FIG. 1, the inclined part 922 is disposed at an angle with the inner wall of the first housing 7, the first housing 7 exerts a force on the inclined part 922, which is beneficial to improving the reliability of the contact between the second part 921 and the first housing 7.

Figure 11:
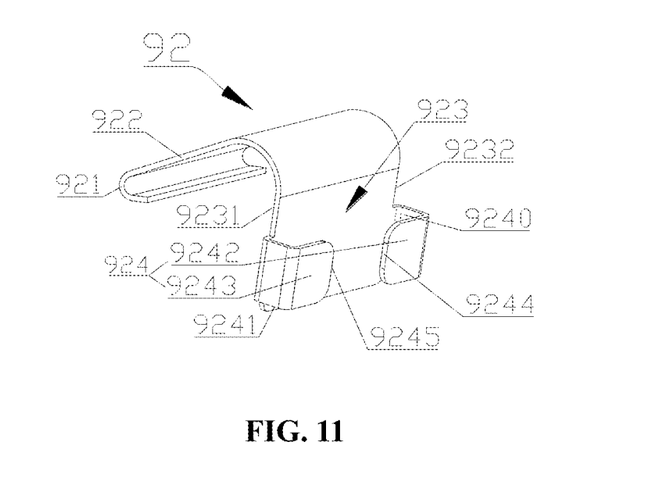
FIG. 11 is a three-dimensional structure diagram of a second conductive part in FIG. 9.

Specifically, referring to FIG. 9 to FIG. 11, the conductive member 9 includes a first conductive part 91 and a second conductive part 92, and in this embodiment, the first conductive part 91 and the second conductive part 92 are separately arranged, the "separate arrangement" here means that the first conductive part 91 and the second conductive part 92 are processed separately and then assembled; of course, the first conductive part 91 and the second conductive part 92 may also be an integral structure, the "integral structure" here means that the first conductive part 91 and the second conductive part 92 are processed into one piece; referring to FIG. 9 to FIG. 11, in this embodiment, the first part 911 is formed on the first conductive part 91, the second part 921 and the inclined part 922 are formed on the second conductive part 92, the second conductive part 92 has elasticity, and the first conductive part 91 is in contact with and connected with the second conductive part 92; in combination with FIG. 1, FIG. 9 to FIG. 11, in this embodiment, one end of the first conductive part 91 is electrically connected with the reference ground plane of the electric control board assembly 6, the other end of the first conductive part 91 is connected with the insulating frame 42, the first conductive part 91 is non-electrically connected with the winding 43 in FIG. 1.

Referring to FIG. 9 to FIG. 11, in this embodiment, the second conductive part 92 further includes a body part 923 and a limiting part 924, part of the first conductive part 91 is in contact with the body part 923, one end of the limiting part 924 is connected with the first side surface 9231 of the body part 923, the other end of the limiting part 924 is connected with the second side surface 9232 of the body part 923, the inclined part 922 is connected with the upper end of the body part 923, in this embodiment, the inclined part 922 is connected with the upper end of the body part 923 by an arc part, the second part 921 is located at one side of the body part 923, and part of the limiting part 924 is located at the other side of the body part 923; the limiting part 924 has an accommodating cavity 9240, the first conductive part 91 passes through the accommodating cavity 9240, in combination with FIG. 9, the first conductive part 91 passes through the limiting part 924, one end of the first conductive part 91 is located at one side of the limiting part 924, one end of the second conductive part 92 is located at the other side of the limiting part 924; referring to FIG. 9 to FIG. 11, the first conductive part 91 includes a first limiting surface 912, the lower end surface 9241 of the limiting part 924 of the second conductive part 92 is located above the first limiting surface 912, or the lower end surface 9241 of the limiting part 924 abuts against the first limiting surface 912, and the second limiting part 924 can be prevented from sliding down along the length direction of the first conductive part 91.

Referring to FIG. 10, in this embodiment, the first conductive part 91 further includes a mating surface 913 and a second limiting surface 914, one end of the first limiting surface 912 is connected with one end of the mating surface 913, one end of the second limiting surface 914 is connected with the other end of the mating surface 913, in combination with FIG. 9 to FIG. 11, a notch is formed on the side surface of the first conductive part 91, the first limiting surface 912, the mating surface 913 and the second limiting surface 914 are respectively formed on the wall of the notch from bottom to top, at least part of the mating surface 913 is located in the accommodating cavity 9240 of the limiting part 924, the first limiting surface 912 is located at one side of the limiting part 924, and the second limiting surface 914 is located at the other side of the limiting part 924, and the second limiting part 924 can be prevented from sliding up and down along the length direction of the first conductive part 91; referring to FIG. 10, the first conductive part 91 further includes an inclined surface 915, one end of the inclined surface 915 is connected with the other end of the second limiting surface 914, along the length direction of the first conductive part 91, the inclined surface 915 is located above the mating surface 913, referring to FIG. 11, the limiting part 924 further includes a first sub-part 9242 and a second sub-part 9243, the first end of the first sub-part 9242 is connected with the first side surface 9231 of the body part 923, the second end 9244 of the first sub-part 9242 is a free end, the first end of the second sub-part 9243 is connected with the second side surface 9232 of the body part 923, the second end 9245 of the second sub-part 9243 is a free end, the second end 9244 of the first sub-part 9242 has a set distance from the second end 9245 of the second sub-part 9243, referring to FIG. 9 to FIG. 11 in combination, when the limiting part 924 of the second conductive part 92 is inserted from the upper end of the first conductive part 91, the side wall corresponding to the accommodating cavity 9240 of the limiting part 924 is in contact with the inclined surface 915 of the first conductive part 91, and the first sub-part 9242 and the second sub-part 9243 can be elastically deformed, so that the mating surface 913 can be located in the accommodating cavity 9240 of the limiting part 924, thereby realizing the limiting connection between the second conductive part 92 and the first conductive part 91; in this embodiment, after the second conductive part 92 is limitedly connected with the first conductive part 91, the second conductive part 92 and the first conductive part 91 are fixed by welding.

Figure 12:
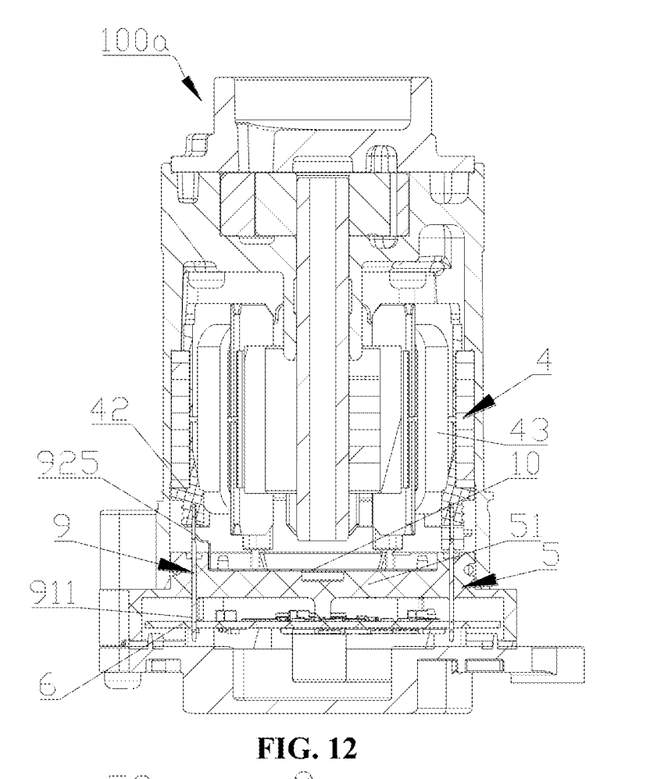
FIG. 12 is a schematic cross-sectional structural view of a second embodiment of the electronic oil pump provided according to the present application.

Referring to FIG. 12, FIG. 12 is a structural diagram of a second embodiment of an electronic oil pump in the present application; the structure of the electronic oil pump of the second embodiment is described in detail below.

Referring to FIG. 12, in this embodiment, the electronic oil pump 100a further includes a shielding member 10, the stator assembly 4, the shielding member 10 and the electric control board assembly 6 are axially distributed along the height direction of the electronic oil pump, at least part of the shielding member 10 is located between the stator assembly 4 and the electric control board assembly 6; the shielding member 10 is made of conductive metal material, and at least part of the shielding member 10 covers at least part of the winding 43; in this way, the shielding member 10 can absorb and reflect at least part of the electromagnetic waves radiated by the winding 43 toward the electric control board assembly 6, which is beneficial to reducing the interference of the electromagnetic waves generated by the winding 43 on the electric control board assembly 6.

Figure 13:
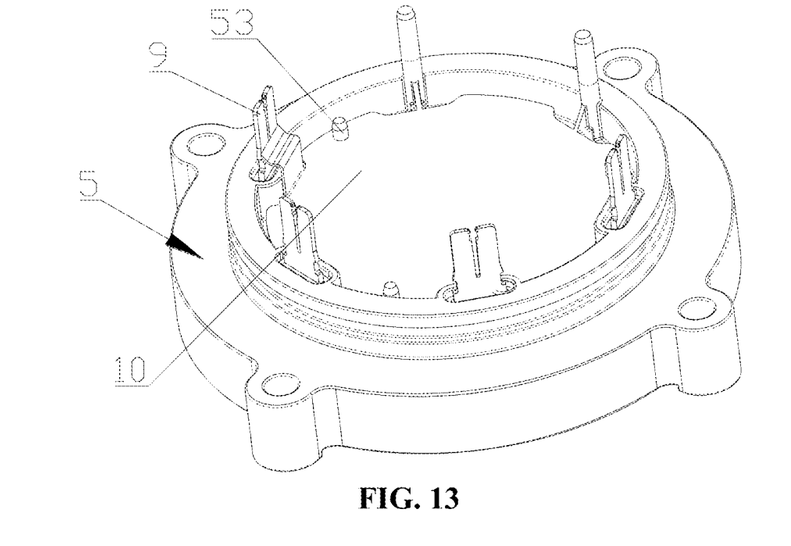
FIG. 13 is a three-dimensional structure diagram of the partition member, the conductive member and a shielding member in FIG. 12 assembled together.
Figure 14:
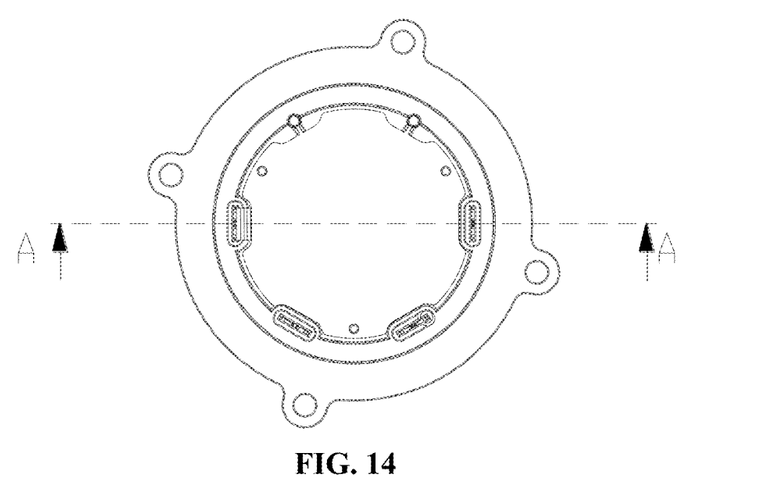
FIG. 14 is a front view of the partition member, the conductive member and the shielding member in FIG. 13 assembled together.

Referring to FIG. 12 and FIG. 13, in this embodiment, the shielding member 10 is fixedly connected with the partition member 5, of course, the shielding member 10 and the partition member 5 can also be limited; specifically, in this embodiment, the shielding member 10 is located between the stator assembly 4 and the main body 51 of the partition member 5, the shielding member 10 is fixedly connected with the main body 51 of the partition member 5, of course, the shielding member 10 may also be limited with the main body 51 of the partition member 5.

Specifically, referring to FIG. 13 to FIG. 16, the partition member 5 further includes at least two protruding posts 53, along the axial direction of the partition member 5, the at least two protruding posts 53 is convexly provided from the upper end face of the main body 51 of the partition member 5; the shielding member 10 includes at least two through holes 101, and the at least two protruding posts 53 passes through the through holes 101, the shielding member 10 and the partition member 5 can be fixedly connected by hot riveting the part of the at least two protruding posts 53 protruding out of the through hole 101; of course, the partition member 5 can also be formed by injection molding with the shielding member 10 as an insert, that is, the shielding member 10 is connected to the partition member 5 by injection molding.

Referring to FIG. 12 to FIG. 17, the electronic oil pump 100a further includes a conductive member 9, the conductive member 9 passes through the main body 51 of the partition member 5, the conductive member 9 includes a first part 911 and an upper part 925, the first part 911 is electrically connected with the reference ground plane of the electric control board assembly 6, in this embodiment, the upper part 925 of the conductive member 9 is in contact with the shielding member 10, the conductive member 9 is electrically connected with the reference ground plane of the electric control board assembly 6 and the shielding member 10; in the above way, the shielding member 10 is indirectly electrically connected with the reference ground plane of the electric control board assembly 6; the beneficial effects are: firstly, a low impedance path is provided for the interference voltage in the stator assembly 4, which is beneficial to reducing the electromagnetic radiation of the stator assembly 4, and further reducing the interference of electromagnetic radiation generated by stator assembly 4 on electric control board assembly 6 and/or other external devices; secondly, when the surface of the shielding member 10 has static electricity, the static electricity can be conducted to the reference ground plane of the electric control board assembly 6, when the reference ground plane of the electric control board assembly 6 is grounded to the outside, for example, the reference ground plane of the electric control board assembly 6 is grounded to the outside through the electric connection between the conductive member and the pump housing; or the reference ground plane of the electric control board assembly 6 is grounded to the outside by other means, the static electricity conducted to the reference ground plane of the electric control board assembly 6 is then conducted to the outside grounding point, which is conducive to reducing the static electricity accumulated on the surface of the shielding member 10, and further helps to reduce the influence of the above static electricity on the performance of external systems and/or electronic components; thirdly, when the surface of the electric control board assembly 6 has static electricity, the above static electricity can be conducted to the shielding member 10 through the conductive member 9, which is conducive to reducing the static electricity accumulated on the surface of the electric control board assembly 6, and further helps to reduce the influence of the above static electricity on the performance of external systems and/or electronic components.

Referring to FIG. 12, in this embodiment, the upper part 925 of the conductive member 9 is connected with the insulating frame 42, and the conductive member 9 is non-electrically connected with the winding 43, of course, the top end of the upper part 925 of the conductive member 9 may also be a free end, in which case the upper part 925 of the conductive member 9 is not connected with the insulating frame 42 or other components.

Figure 15:
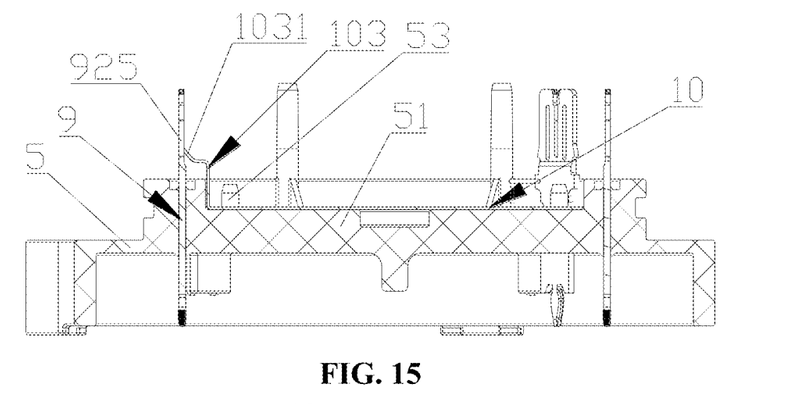
FIG. 15 is a schematic structural diagram of a section taken along the A-A direction in FIG. 14.
Figure 16:
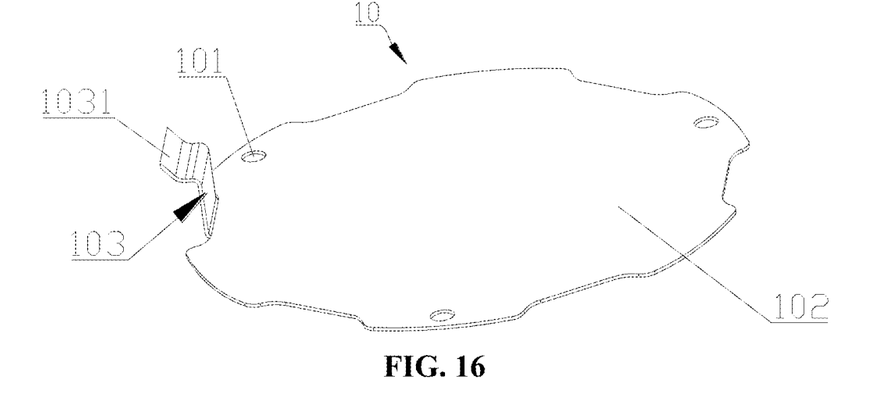
FIG. 16 is a schematic three-dimensional structure diagram of the shielding member in FIG. 12.
Figure 17:
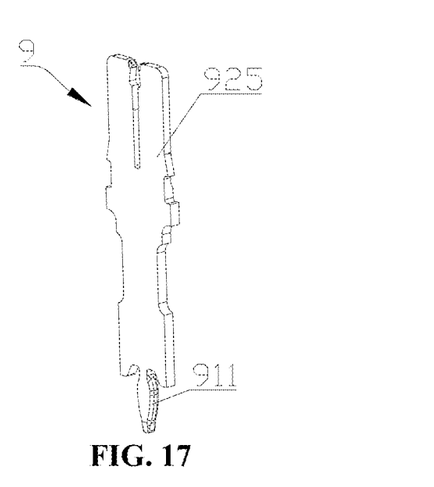
FIG. 17 is a schematic three-dimensional structure diagram of the conductive member in FIG. 12.

Referring to FIG. 16, the shielding member 10 includes a base part 102 and a lead-out part 103, the lead-out part 103 is connected to the peripheral surface of the base part 102, and the lead-out part 103 is convex; specifically, in this embodiment, the base part 102 and the lead-out part 103 are of an integral structure, of course, the base part 102 and the lead-out part 103 may be solely arranged and fixedly connected; referring to FIG. 15 and FIG. 16, in this embodiment, the lead-out part 103 is in contact with the upper part 925 of the conductive member 9, and the lead-out part 103 is elastic, the lead-out part 103 includes an inclined section 1031, the main section of the inclined section 1031 is arranged at an angle with the conductive member 9, and the front end of the inclined section 1031 is in contact with the conductive member 9, which helps to improve the reliability of the contact between the lead-out part 103 and the conductive member 9.

Compared with the first embodiment of the electronic oil pump, in this embodiment, the electronic oil pump 100a further includes a shielding member 10, the conductive member 9 is electrically connected with the reference ground plane of the electric control board assembly 6 and the shielding member 10; other features in this embodiment can refer to the first embodiment of the electronic oil pump, which is not be described here.

Figure 18:
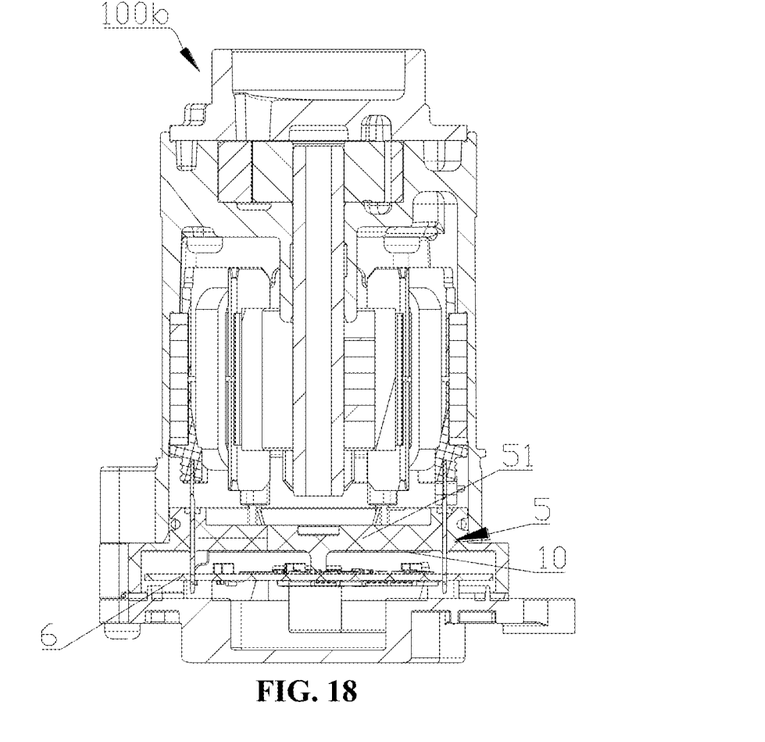
FIG. 18 is a schematic cross-sectional structural view of a third embodiment of the electronic oil pump provided according to the present application.

Referring to FIG. 18, FIG. 18 is a structural diagram of a third embodiment of an electronic oil pump in the present application; the structure of the electronic oil pump of the third embodiment is described in detail below.

Figure 19:
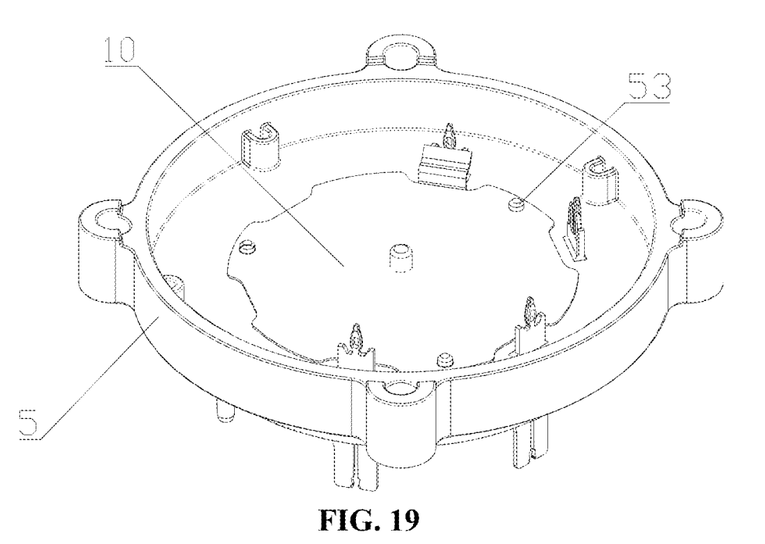
FIG. 19 is a three-dimensional structure diagram of the partition member, the conductive member and a shielding member in FIG. 18 assembled together.

Referring to FIG. 18 and FIG. 19, in this embodiment, the electronic oil pump 100b further includes a shielding member 10, the shielding member 10 is located between the main body 51 of the partition member 5 and the electric control board assembly 6, the shielding member 10 is fixedly connected with the main body 51 of the partition member 5, of course, the shielding member 10 may also be limited with the main body 51 of the partition member 5; specifically, referring to FIG. 19, the partition member 5 further includes at least two protruding posts 53, along the axial direction of the partition member 5, the at least two protruding posts 53 are convexly provided from the lower end face of the main body 51 of the partition member 5; the shielding member 10 includes at least two through holes, and the at least two protruding posts 53 passes through the through holes, the shielding member 10 and the partition member 5 can be fixedly connected by hot riveting the part of the at least two protruding posts 53 protruding out of the through hole; of course, the partition member can also be formed by injection molding with the shielding member 10 as an insert, that is, the shielding member 10 is connected to the partition member 5 by injection molding.

Compared with the second embodiment of the electronic oil pump, in this embodiment, the shielding member 10 is located between the main body 51 of the partition member 5 and the electric control board assembly 6; other features in this embodiment can refer to the second embodiment of the electronic oil pump, which is not be described here.

Figure 20:
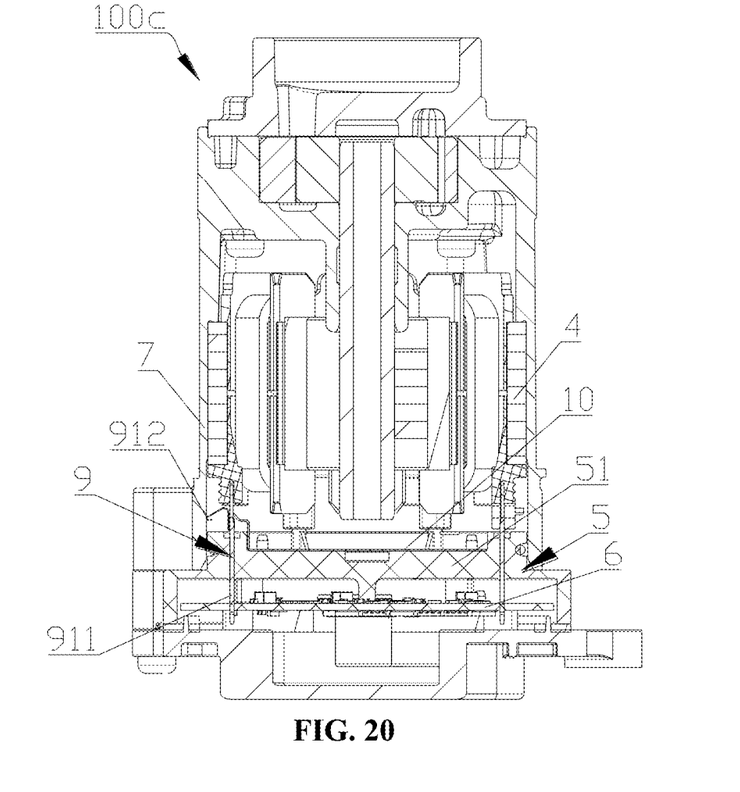
FIG. 20 is a schematic cross-sectional structural view of a fourth embodiment of the electronic oil pump provided according to the present application.

Referring to FIG. 20, FIG. 20 is a structural diagram of a fourth embodiment of an electronic oil pump in the present application; the structure of the electronic oil pump of the fourth embodiment is described in detail below.

Figure 21:
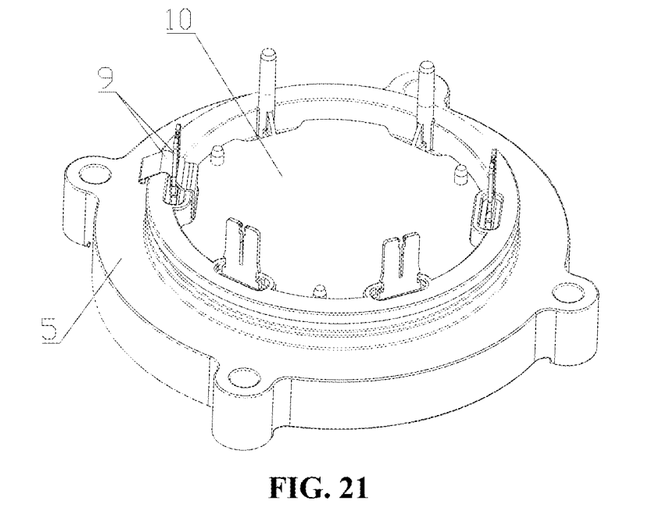
FIG. 21 is a three-dimensional structure diagram of the partition member, the conductive member and a shielding member in FIG. 20 assembled together.

Referring to FIG. 20 and FIG. 21, in this embodiment, the electronic oil pump 100c includes a conductive member 9, the conductive member 9 electrically connects the reference ground plane of the electric control board assembly 6 with the first housing 7, and the first housing 7 can conduct electricity; specifically, the conductive member 9 includes a first part 911 and a second part 912, the first part 911 is electrically connected with the reference ground plane of the electric control board assembly 6, the second part 912 abuts against the inner wall of the first housing 7, the reference ground plane of the electric control board assembly 64 is electrically conducted to the first housing 7 through the conductive member 9; the electronic oil pump 100c further includes a shielding member 10, the shielding member 10 is located between the main body 51 of the partition member 5 and the stator assembly 4, the shielding member 10 is fixedly connected with the partition member 5, the shielding member 10 is in contact with the conductive member 9, as part of the conductive member 9 is electrically connected with the reference ground plane of the electric control board assembly 6, another part of the conductive member 9 contacts the first housing 7, so that the shielding member 10 may also be indirectly connected with the reference ground plane of the electric control board assembly 6; in the above manner, the first housing 7 and the shielding member 10 are both indirectly electrically connected with the reference ground plane of the electric control board assembly 6; the beneficial effects are: firstly, a low impedance path is provided for the interference voltage in the stator assembly 4 and the electric control board assembly 6, which is beneficial to reducing the electromagnetic radiation of the stator assembly 4 and the electric control board assembly 6, and further reducing the interference of electromagnetic radiation generated by the stator assembly 4 and the electric control board assembly 6 on electronic components/or other external devices; secondly, when the surface of the first housing 7 and the shielding member 10 has static electricity, the static electricity can be conducted to the reference ground plane of the electric control board assembly 6, when the reference ground plane of the electric control board assembly 6 is grounded to the outside, the static electricity conducted to the reference ground plane is further conducted to the outside grounding point, which is conducive to reducing the static electricity accumulated on the surface of the first housing 7 and the shielding member 10, and further helps to reduce the influence of the above static electricity on the performance of external systems and/or electronic components; thirdly, when the surface of the electric control board assembly 6 has static electricity, the above static electricity can be conducted to the first housing 7 and the shielding member 10 through the conductive member 9, which is conducive to reducing the static electricity accumulated on the surface of the electric control board assembly 6, and further helps to reduce the influence of the above static electricity on the performance of external systems and/or electronic components; besides, in this embodiment, the stator core 41, the second housing 8 and the pump cover 1 are all in contact with the first housing 7, on one hand, the stator core 41 and the second housing 8 are electrically connected with the reference ground plane of the electric control board assembly, the static electricity on the surface of the stator core 41, the second housing 8 and the pump cover 1 can be conducted to the reference ground plane of the electric control board assembly 6, the above static electricity is further conducted to the outside grounding point, which is conducive to reducing the influence of static electricity on the electric control board assembly 6 and/or other external devices; on the other hand, the grounding area of the electronic oil pump can be increased, which can provide a low impedance path for the interference voltage in the electric control board assembly 6 and the stator assembly 4, which is beneficial to reduce an electromagnetic radiation of the electric control board assembly 6 and the stator assembly 4, and further to reduce the interference of the above electromagnetic radiation to electronic components and/or other external devices; in this embodiment, the pump cover 1, the first housing 7 and the second housing 8 are made of metal, of course, it is also possible that the material of the first housing 7 is metal, and the material of the pump cover 1 and the second housing 8 is nonmetal. Referring to FIG. 1, in this embodiment, static electricity is conducted by one end of the conductive member 9 contacting the first housing 7, but of course, one end of the conductive member 9 may also contact the stator core 41 or the second housing 8.

Compared with the first embodiment of the electronic oil pump, in this embodiment, the electronic oil pump 100c further includes a shielding member 10, which is in contact with the conductive member 9; the conductive member in this embodiment can refer to the conductive member in the first embodiment of the electronic oil pump, the shielding member in this embodiment can refer to the shielding member in the second embodiment of the electronic oil pump, which is not repeated here.

Figure 22:
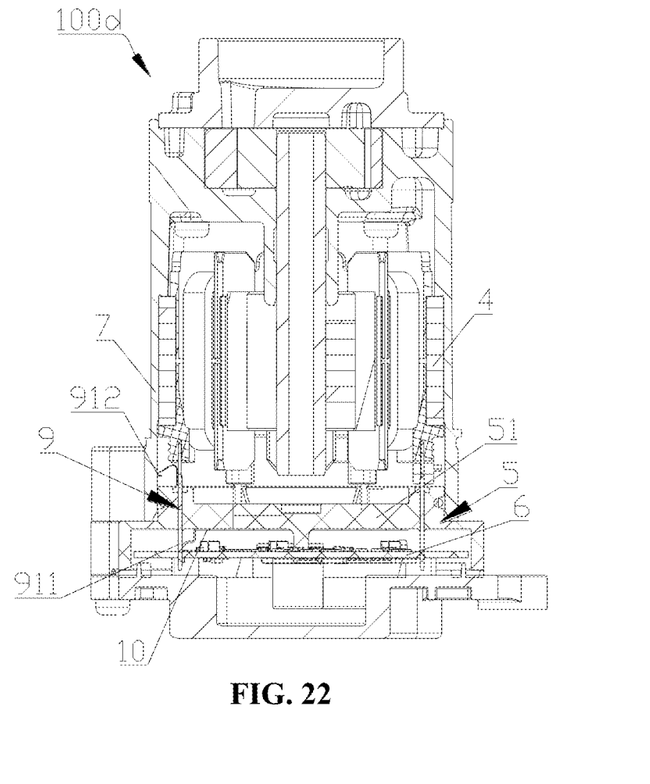
FIG. 22 is a schematic cross-sectional structural view of a fifth embodiment of the electronic oil pump provided according to the present application.

Referring to FIG. 22, FIG. 22 is a structural diagram of a fifth embodiment of an electronic oil pump in the present application; the structure of the electronic oil pump of the fifth embodiment is described in detail below.

Referring to FIG. 22, in this embodiment, the electronic oil pump 100d includes a conductive member 9, the conductive member 9 electrically connects the reference ground plane of the electric control board assembly 6 with the first housing 7, and the first housing 7 can conduct electricity; specifically, the conductive member 9 includes a first part 911 and a second part 912, the first part 911 is electrically connected with the reference ground plane of the electric control board assembly 6, the second part 912 abuts against the inner wall of the first housing 7, the reference ground plane of the electric control board assembly 64 is electrically conducted with the first housing 7 through the conductive member 9; the electronic oil pump 100c further includes a shielding member 10, the shielding member 10 is located between the main body 51 of the partition member 5 and the electric control board assembly 6, the shielding member 10 is fixedly connected with the partition member 5, the shielding member 10 is in contact with the conductive member 9, as part of the conductive member 9 is electrically connected with the reference ground plane of the electric control board assembly 6, another part of the conductive member 9 contacts the first housing 7, so that the shielding member 10 may also be indirectly connected with the reference ground plane of the electric control board assembly 6; in the above way, the beneficial effects are: firstly, a low impedance path is provided for the interference voltage in the stator assembly 4 and the electric control board assembly 6, which is beneficial to reducing the electromagnetic radiation of the stator assembly 4 and the electric control board assembly 6, and further reducing the interference of electromagnetic radiation generated by the stator assembly 4 and the electric control board assembly 6 on electronic components/or other external devices; secondly, when the surface of the first housing 7 and the shielding member 10 has static electricity, the static electricity can be conducted to the reference ground plane of the electric control board assembly 6, when the reference ground plane of the electric control board assembly 6 is grounded to the outside, the static electricity conducted to the reference ground plane is further conducted to the outside grounding point, which is conducive to reducing the static electricity accumulated on the surface of the first housing 7 and the shielding member 10, and further helps to reduce the influence of the above static electricity on the performance of external systems and/or electronic components; thirdly, when the surface of the electric control board assembly 6 has static electricity, the above static electricity can be conducted to the first housing 7 and the shielding member 10 through the conductive member 9, which is conducive to reducing the static electricity accumulated on the surface of the electric control board assembly 6, and further helps to reduce the influence of the above static electricity on the performance of external systems and/or electronic components.

Compared with the first embodiment of the electronic oil pump, in this embodiment, the electronic oil pump 100*d* further includes a shielding member 10, which is in contact with the conductive member 9; the conductive member in this embodiment can refer to the conductive member in the first embodiment of the electronic oil pump, the shielding member in this embodiment can refer to the shielding member in the third embodiment of the electronic oil pump, which is not repeated here.

The above embodiments are only used to illustrate the present application rather than limit the technical solutions described in the present application. Although the present application is described in detail in this specification with reference to the above embodiments, those of ordinary skill in the art should understand that those skilled in the art may still modify or equivalently replace the present application, and all technical solutions and improvements thereof that do not depart from the spirit and scope of the present application shall be covered within the scope of the claims of the present application.

What is claimed is:

1. An electronic oil pump, comprising a stator assembly and an electric control board assembly, wherein the stator assembly is electrically connected with the electric control board assembly; the electric control board assembly comprises an electronic component; the electronic oil pump further comprises a pump housing and a conductive member, the pump housing can conduct electricity, and the conductive member electrically connects a reference ground plane of the electric control board assembly with the pump housing,
wherein the electronic oil pump further comprises a partition member, at least part of the partition member is located between the stator assembly and the electric control board assembly; wherein the conductive member is used as an insert, and the partition member is formed by injection molding, along a height direction of the partition member, part of the conductive member passes through the partition member; wherein the joint between the conductive member passing through the partition member and the partition member is sealed,
wherein the partition member comprises a first convex part, the first convex part protrudes from an upper surface of a main body of the partition member, and the conductive member passes through the first convex part: wherein the first convex part comprises a groove, and the groove is recessed from the upper surface of the first convex part, the groove does not reach the lower surface of the main body of the partition member, the conductive member passing through the main body of the partition member passes through the groove, sealant is filled between the outer periphery of part of the conductive member and the inner wall of the groove, and this part of the conductive member is located in the groove.

2. The electronic oil pump according to claim 1, wherein the pump housing comprises a first housing, the first housing is at least partially arranged on the periphery of the stator assembly; the conductive member comprises a first part and a second part, the first part is electrically connected with the reference ground plane of the electric control board assembly, the second part abuts against the inner wall of the first housing; the reference ground plane of the electric control board assembly is electrically conducted with the first housing through the conductive member.

3. The electronic oil pump according to claim 2, wherein the electric control board assembly comprises a substrate, the substrate comprises a first surface and a second surface, the first surface is closer to the stator assembly than the second surface; wherein the electric control board assembly further comprises an abutting part, the abutting part is located on the first surface, and the abutting part is electrically connected with the reference ground plane of the electric control board assembly, the first part is in contact with the abutting part and electrically connected with the abutting part.

4. The electronic oil pump according to claim 2, wherein the electric control board assembly comprises a substrate, the substrate comprises a first surface and a second surface, the first surface is closer to the stator assembly than the second surface; the substrate comprises a through hole, the through hole is defined in a thickness direction of the substrate, the first part inserts into the through hole and is tightly matched with the through hole.

5. The electronic oil pump according to claim 2, wherein the conductive member is at least partially elastic, and the elastic conductive member comprises an inclined part, the front end of the inclined part is connected with the second part, or, the second part is located at the front end of the inclined part, the inclined part is integrally provided with the second part; the inclined part is disposed at an angle with the inner wall of the first housing.

6. The electronic oil pump according to claim 5, wherein the conductive member comprises a first conductive part and a second conductive part, the first conductive part and the second conductive part are arranged separately, the first conductive part and the second conductive part are in contact and connected; the second conductive part has elasticity, the first part is formed on the first conductive part, and the second part is formed on the second conductive part.

7. The electronic oil pump according to claim 6, wherein the second conductive part comprises a body part and a limiting part, one end of the limiting part is connected with one side surface of the body part, the other end of the limiting part is connected with the other side surface of the body part, the inclined part is connected with the upper end of the body part, the second part is located at one side of the body part, and part of the limiting part is located at the other side of the body part; wherein the limiting part is provided with an accommodating cavity, the first conductive part passes through the accommodating cavity, a first end of the first conductive part is located at one side of the limiting part, and a second end of the second conductive part is located at the other side of the limiting part; wherein the first conductive part is in contact with the body part.

8. The electronic oil pump according to claim 7, wherein the limiting part further comprises a first sub-part and a second sub-part, a first end of the first sub-part is connected with the first side surface of the body part, a second end of the first sub-part is a free end, and a first end of the second sub-part is connected with the second side surface of the body part, a second end of the second sub-part is a free end, and the second end of the first sub-part has a set distance from the second end of the second sub-part.

9. The electronic oil pump according to claim 6, wherein the stator assembly comprises a stator core, a winding and an insulating frame, the insulating frame covers at least part of the surface of the stator core, and the winding is wound around the insulating frame, the first end of the first conductive part is electrically connected with the reference ground plane of the electric control board assembly, the second end of the first conductive part is connected with the insulating frame, the first conductive part is non-electrically connected with the winding.

10. The electronic oil pump according to claim 1, wherein the electronic oil pump comprises a shielding member, the stator assembly, at least part of the shielding member and the electric control board assembly are distributed along the height direction of the electronic oil pump, at least part of the shielding member is located between the stator assembly and the electric control board assembly; the shielding member is made of conductive metal material, and at least part of the shielding member covers at least part of the winding of the stator assembly.

11. The electronic oil pump according to claim 10, wherein the electronic oil pump further comprises a partition member, at least part of the partition member is located between the stator assembly and the electric control board assembly; the shielding member is connected with the partition member.

12. The electronic oil pump according to claim 11, wherein the partition member further comprises at least two protruding posts, along the axial direction of the partition member, the at least two protruding posts are convexly arranged from the end face of a main body of the partition member; the shielding member comprises at least two through holes, and the at least two protruding posts pass through the through holes, the shielding member and the partition member can be fixedly connected by hot riveting the part of the at least two protruding posts protruding out of the through hole.

13. The electronic oil pump according to claim 11, wherein the conductive member comprises a first part, the first part is electrically connected with the reference ground plane of the electric control board assembly, the shielding member is in contact with the conductive member, the conductive member is electrically connected with the reference ground plane of the electric control board assembly and the shielding member.

* * * * *